United States Patent Office 3,577,515
Patented May 4, 1971

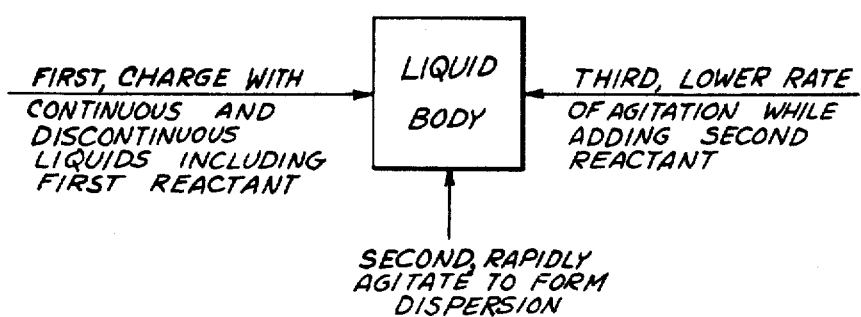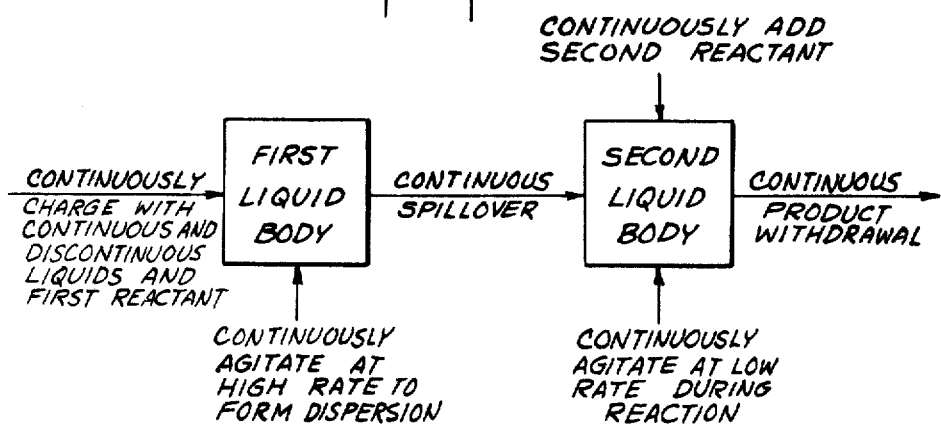

3,577,515
ENCAPSULATION BY INTERFACIAL
POLYCONDENSATION
Jan E. Vandegaer, Wayne, N.J., assignor to
Pennwalt Corporation
Continuation-in-part of abandoned application Ser. No. 525,038, Feb. 4, 1966, which is a continuation-in-part of abandoned application Ser. No. 330,255, Dec. 13, 1963. This application Mar. 4, 1968, Ser. No. 710,293
Int. Cl. A01n *17/00;* B01j *13/02;* B44d *1/02*
U.S. Cl. 424—32                           19 Claims

ABSTRACT OF THE DISCLOSURE

Procedure for encapsulation of materials initially embodied, contained or carried in liquid is effected by interfacial polycondensation between coacting intermediates respectively in immiscible liquids, droplets of one liquid which is to be encapsulated and which contains one intermediate, being first established in a body of the other liquid. Thereafter the second intermediate is incorporated in the other liquid to produce minute capsules of the first liquid having a skin of polycondensate, e.g. polyamide, polysulfonamide, polyester, polycarbonate, polyurethane, or polyurea. Notably effective operation involves continuously supplying both the first liquid containing the first intermediate, and the second liquid, into a region where continuous agitation effects dispersion of the first liquid as droplets, the dispersion being continuously brought together with the second intermediate, thereby continuously establishing the droplet dispersion in liquid containing the second intermediate, and in consequence continuously producing encapsulated droplets by interfacial polycondensation between the intermediates.

Special advantages for the process and particularly for the resulting capsules are achieved where at least one of the intermediates comprises at least in part a polyfunctional reactant which is complementary to the other of the intermediates in polycondensate-forming reaction, such that effective cross-linking is produced among the polymer chains. For such purpose, either or each of the intermediate materials may consist of a difunctional reactant together wtih a polyfunctional reactant, the latter being an agent which has more than two functional groups that are effective for liriking reaction, whereby the cross-linking is effected. The two liquids are characteristically of aqueous or organic-solvent types, the process being effective for encapsulating either type. A variety of materials can be encapsulated, useful for many purposes with special attributes of the capsules resulting from the cross-linked skin.

RELATED APPLICATIONS

This application is a continuation-in-part of my copending application, Ser. No. 330,255, filed Dec. 13, 1963 for Encapsulation, now abandoned, and of my copending application Ser. No. 525,038, filed Feb. 4, 1966 for Encapsulation, now abandoned, which was itself a continuation-in-part of my aforesaid application Ser. No. 330,255.

BACKGROUND OF THE INVENTION (1) Field of the invention

This invention relates to encapsulation and particularly to the production of small or minute capsules constituted by a skin of organic composition enclosing a liquid droplet or other body of material. The invention is specifically directed to a process whereby such capsules, which may be produced to any desired size, e.g. of the order of one millimeter or larger or in a range of smaller dimensions, are conveniently and rapidly evolved by chemical reaction as a suspension or collection of discrete spheres or spheroids in a body of liquid from which they may be readily separated.

Capsules of this character have a variety of uses, as for containing dyes, inks, chemical reagents, pharmaceuticals, flavoring materials, pesticides, herbicides, peroxides, and indeed anything which can be dissolved, suspended or otherwise constituted in or as a liquid enclosed by the capsule, and which, in such liquid or other form, is to be preserved until it is released by some agency that breaks, crushes, melts, dissolves or otherwise removes the capsule skin, or until release by diffusion is effected under suitable conditions. While this encapsulation is primarily concerned with the preservation of minute droplets in the liquid state, it is also contemplated that the process may be used for enclosing liquid bodies which may be converted, within the capsule, to other, e.g. solid form, yielding encased solid particles having special purposes as a granular, protected form of the enclosed substance.

(2) Description of the prior art

A variety of techniques have heretofore been used or proposed for encapsulation, among which one principal method has been the deposition of the enclosing film by coacervation, and other procedures have involved polymerizing a substance contained in droplets or in a surrounding, continuous liquid phase, so as to deposit the resulting polymer (from the droplets or the liquid phase) at the surface of such droplets. Another method involves the shooting of droplets through a falling film of liquid capsule-wall material which then solidifies around the individual droplets. A particular object of the present invention is to provide a new and improved encapsulation process, which is rapid and effective and which avoids difficulties heretofore existent in prior methods, including difficulties of control and of requirements as to temperature. A special advantage of the novel method of the invention is that it is convenient and simple, and requires no complex or expensive equipment.

While establishment of solid organic filaments, films and other bodies by polycondensation has been well known and widely used, and while processes have been proposed or used for producing films or the like by interfacial polycondensation, a practical, convenient and readily controlled mode of encapsulation utilizing such reaction has not been available. As will be appreciated, interfacial condensation generally involves bringing together two immiscible liquids, e.g. water and an organic solvent, respectively containing complementary, direct-acting, organic intermediates that will react with each other to establish a solid polycondensate, i.e. a resin such as a polyamide, polyester, polyurethane, polyurea, or like substance. For instance, by effecting contact between a diamine dissolved or dispersed in water and a diacid chloride dispersed in an essentially water immiscible solvent, the two difunctional intermediates can be caused to react at the interface of the liquids to yield a film or skin of polyamide. In this manner continuous filaments, sheets or the like have been prepared, as by drawing such strand or film upward, so to speak, from one liquid through the other. A great many condensation reactions of this sort have also been disclosed for other purposes, as in the treatment of wool to render it resistant to shrinking.

Although it has been proposed to spray droplets of organic solvent containing diacid chloride into an aqueous liquid containing, for instance, ethylene glycol, with the object of encapsulating the organic liquid or oil in polyester capsules, such efforts have fallen short of practical value in various respects. In the first place, special apparatus is required. Moreover, experiments have indicated difficulty in establishing the desired capsules in discrete form and avoiding coalescence of the reactants and liquids into a heterogeneous mass of material lacking distinct capsule formation. Control of capsule size or uniformity is troublesome and the process appears limited in the types of reactions and products involved.

SUMMARY OF THE INVENTION

In accordance with preferred practice of the present invention, it has been discovered that effective encapsulation by interfacial condensation of complementary, organic intermediates, can be effected in a process which utilizes two substantially immiscible liquids respectively containing the intermediates and which comprises establishing a physical dispersion of one of the liquids containing one of the intermediates, e.g. in solution therein, within a body of the other liquid to which the other intermediate has not yet been added, such dispersion thereby establishing droplets of the first, intermediate-containing liquid within a continuous liquid phase that consists of the other liquid. Thereafter, and preferably with moderate agitation of the dispersion, the other intermediate is brought together with the continuous liquid phase, e.g. for solution therein, for thereby effecting the desired condensation reaction at the interfaces between the droplets and the continuous phase.

In this fashion fully satisfactory, discrete capsules are formed having a skin consisting of the produced polycondensate and containing the first liquid, it being thereafter a simple matter to separate the capsules for any desired utilization, such separation process involving, for example, settling, filtration or skimming of the collected capsules, washing, and if desired, drying. The initial dispersion of one of the liquids in the other may be assisted with an appropriate emulsifying or dispersing agent, and control of the size and uniformity of the ultimate capsules is readily effected in the initial dispersing step, as by varying the extent of agitation, by selection of dispersing agents where used, and by selection of relative amounts of the liquids. Capsules ranging from microscopic sizes to dimensions of the order of millimeters or more are readily produced, and with appropriate limitation of the extent of agitation when the second intermediate is added to the continuous phase, there is no difficulty of undesired agglomeration or coalescence of the capsules.

A particularly important feature is that, considering the two liquids to be respectively aqueous and of organic character (suitable organic liquids being herein generically designated as organic solvents), the process may be designed and performed to encapsulate either one of the liquids, as desired. Selection in this respect is basically attained by choosing appropriate relative proportions of such liquids, that one which is in lesser amount ordinarily becoming the dispersed phase and thus the contents of the capsules. That is to say, the determination of the liquid to constitute the dispersed phase is effected in accordance with general principles of forming water-in-oil or oil-in-water emulsions.

The invention is applicable to a large variety of polycondensation reactions, i.e. to many different pairs of reactants capable of interfacial condensation from respective carrier liquids to yield solid films by prompt, indeed usually immediate reaction at the liquid interface, generally at room temperature or at least at convenient temperatures. Indeed a number of basic types of polycondensation reactions, capable of effectuation between such reactants (i.e. intermediates) in separate, immiscible liquids, are now known as stated hereinabove, and appear to be capable of utilization in the present process. Thus as examples, the resulting capsule skin or enclosure may be produced as a polyamide, polysulfonamide, polyester, polycarbonate, polyurethane, or polyurea, and the reactions of the invention may also involve mixtures of reactants in one or both phases, so as to yield corresponding condensation copolymers if desired. The general types of reaction described below to produce all of the above (including some reactions that could be defined as additions) are herein conveniently termed condensations or polycondensations, especially in that such classification has been used and recognized in the art.

A particularly important feature of invention resides in the discovery that specially effective procedure and superior encapsulated products are attained by providing for cross-linking in the polycondensate, particularly by constituting at least one of the intermediates to be or to include as a component thereof, a polyfunctional reactant which is complementary to the other of the intermediates in polycondensate-forming reaction; remarkable advantage has been found to ensue, insuring production of discrete, readily recovered capsules, with avoidance of coalescence, and with unusual structure for the capsules so produced. Indeed it has been found that in products thus involving cross-linking, selection can readily be made among reactions and reactants and amounts of the latter, to suit the characteristics desired for the capsules, as to the nature, strength or other properties of the capsule wall, or to insure suitability of the reaction conditions to the substances present for inclusion in the capsules.

The term polycondensate is used to define all of the reaction products described herein, including cross-linked condensates (e.g. adding cross-linkages in the types mentioned above), and likewise copolymers, which may also involve cross-linking; for convenience of designation, moreover, generic references herein to a particular kind of condensate, e.g. polyurea or polyamide or polyester, or any other, are intended (unless otherwise stated or apparent from the context) to include copolymers of which the specified single polymer is in effect a significant part. Thus for instance a recital, in the appended claims, of the production of polyurea, or of a polyurea capsule skin, is to be understood as including corresponding copolymers such as of polyurea with polyamide (which can be specifically named, of course, by a hyphenated expression, having the same meaning whichever of the constituents is put first); thus likewise, in this illustration, recital of polyamide in a generic sense includes such polyurea-polyamide copolymer.

Another specific feature of invention resides in a novel and unusually effective continuous process, wherein first and second liquids are continuously supplied to form a first body, with one intermediate contained in the first liquid, and establishing droplets of the first liquid within the second liquid as a continuous phase, the process further including the establishment of a second body of liquids with supply of a second intermediate thereto, and continuous supply of liquid from the first body to the second body, to effectuate polycondensation at the droplet-liquid interfaces for encapsulating the droplets within a skin of polycondensate.

BRIEF DESCRIPTION OF THE DRAWING

FIG. 1 is a schematic representation of one embodiment of a process according to the invention; and FIG. 2 is a schematic representation of a second embodiment of a process according to the invention.

DETAILED DESCRIPTION

In all cases the effective procedure of the invention involves first producing (as by simple agitation) the described dispersion, i.e. of droplets, of one liquid containing one reactant or group of reactants, within a continuous phase of the other liquid which is essentially free of anything that will react by condensation with such reactant or any of such group of reactants. This, of course, does not preclude the possibility that a substance such as a dispersing agent (in the continuous phase) may be chemically so constituted that it would take part, in a minor way, in such reaction. Only thereafter is the second reactant, or group of reactants, brought together with the second, continuous phase liquid, for instance conveniently by bringing together with the second continuous phase liquid such further reactant material in solution in a further small quantity of the last-mentioned liquid or other liquid readily miscible or otherwise distributable therein. The second, continuous phase liquid, may be added to the second reactant, or group of reactants, or the reverse procedure may be followed, i.e. the second reactant may be added to the second, continuous phase liquid. In either case the effect is to bring together the two bodies of liquid, and the choice will depend respectively upon whether a continuous or essentially continuous (FIG. 2), on the one hand, as opposed to a batch or essentially batch process (FIG. 1) on the other hand, is desired to be practiced, as will be more fully pointed out hereinbelow.

By way of general example, it will now be seen that the water or aqueous phase may contain one or more of such substances as diamines, diols, polyamines, polyols and other similar reactant materials, whereas the organic phase will contain one or more compounds such as diacid chlorides, bischloroformates, disulfonyl chlorides, polyacid chlorides, polychloroformates, diisocyanates, polyisocyanates, polysulfonyl chlorides, phosgene, or other organic intermediates capable of the desired condensation reaction with one or more reactants in the aqueous phase. The bringing together of the selected reactant or group with each phase is accomplished as described above, such bringing together of the selected reactant or group and the continuous liquid phase, whether aqueous or organic, being accomplished only after the dispersion of droplets of the other phase has been established.

The thickness or strength of the capsule wall can be selected or controlled in various ways, not only by control of reaction conditions but also by chemical selection, especially in creation of cross-linkage in accordance with the invention. For instance in production of polyamide or polyester capsules by reaction of a diacid chloride with a diamine or diol, a trifunctional acid chloride, and likewise or alternatively a suitable trifunctional amine or -ol, can be used to effectuate cross-linking so as to strengthen the capsule skin by forming a three-dimensional polymer network. These cross-linking agents can be used in varying amounts, depending on purposes to be served and economic considerations. The thickness of the capsule skin can be altered by varying the amounts of reactants or the length of contact time between the liquids after they are brought together. One convenient mode of controlling the size of the capsules is by adjusting the speed of agitation, e.g. in effectuating the original dispersion, smaller capsules being obtained with higher speeds of agitation.

Indeed generally, capsules constituted by skin or wall structure of cross-linked polycondensates are found to be products of distinct and unusual advantage, exhibiting notably higher strength, improved resistance to solvents, and to chemical activity of various encapsulated materials, and slower diffusion rates or better control of diffusion from the capsule, in comparison with other products. The discovery of superiority in such encapsulation involves, as stated, cross-linking reactions, and requires that at least one of the complementary materials for the interfacial reaction comprise a polyfunctional reactant, and in many cases should preferably comprise both a difunctional reactant and at least one polyfunctional reactant. Thus in several examples given below, products containing cross-linkages are achieved in reactions between diacid chloride or the like in the organic phase and a diamine or diol in the aqueous phase by including or adding a polyfunctional intermediate in one phase or the other, or in both phases, e.g. reactants such as a trifunctional acid chloride, or such as a suitable trifunctional amine or triol (exemplified by compounds including three identical amine or hydroxy groups); alternatively in other examples where the sole reactant in the aqueous phase is effectively trifunctional and the chief reactant of the organic phase is a difunctional acid-derived compound, cross-linking is thereby achieved and is increased or enhanced by also adding a polyfunctional acid-derived reactant in the organic phase.

It is believed that the basic interfacial condensation between difunctional intermediates (such as a diacid chloride and a diamine), results in a polymeric product, which though useful for many purposes as a capsule skin, is essentially composed of linear polymeric molecules, i.e. molecules that are linear chains of the groups derived from the reactants. Where, however, either or both of the complementary intermediates is effectively polyfunctional (e.g. a suitable trifunctional acid chloride in the organic phase or a suitable triol or triamine in the aqueous phase), or where at least one of two complementary difunctional intermediates is accompanied by a polyfunctional intermediate that is also complementary (in polycondensate-forming reaction) to the other difunctional intermediate, cross-linking occurs.

The improved structure involving cross-linkage is thus understood to provide links between the linear chains, here and there, i.e. at some localities, which may be frequent or infrequent in a given case. The fundamental groups from the polyfunctional substance or substances used to provide cross-linking, enter or make up linear chains but have one or more further localities susceptible of chemical bonds, and therefore give rise to actual bonds, between or among such supplemental points available for linkage (or between such points and the terminal points of chains), so that there are linkages between adjacent chains, or in a more general sense, occurrences of linkage between one chain and an intermediate locality of another. Such cross-linking of chains is effected through the same type or types of chemical bond that is or are available or presented by the reactants which basically constitute (on condensation) the linear polymeric chains. Moreover, this cross-linking action occurs at the same time as the principal polycondensation reaction, i.e. in that the potentially cross-linking groups are caused to become parts of the polymer chains and therefore are immediately available for producing the desired linking bonds here and there between the chains. While in part the foregoing discussion is predicated on assumed theories of reaction, it is presently believed that it represents a correct general description of the nature of cross-linkage formation in the present processes and the resulting products.

Suspending or emulsifying agents may be conveniently employed, such agents being generally defined herein as dispersing agents. Particularly effective, employed in solution in the water phase where the organic phase is to be dispersed, is a high viscosity, partially hydrolyzed polyvinyl alcohol, for example the product known as Elvanol 50–42 (DuPont). Other useful dispersing agents, preferably for incorporation in the aqueous liquid are: gelatin, and methyl cellulose.

For the encapsulation of water or aqueous solutions the most effective dispersing agents are those commonly used to effectuate water-in-oil emulsions, such as Span 60 (technical sorbitan monostearate, Atlas Chemical Industries, Inc.), aluminum soaps, lecithin, and in general all soaps and surfactants with good oil solubility.

As more specific instances of polycondensation reactions to which the present encapsulation process is applicable, the following may be mentioned: Diamines or polyamines in the water phase and diacid or polyacid chlorides in the organic phase yield capsule walls consisting of polyamides, conveniently sometimes described herein as nylon or nylons. Diamines or polyamines in the aqueous liquid and bischloroformates or polychloroformates in the organic liquid afford a polyurethane capsule skin. Again, diamines or polyamines in water and disulfonyl or polysulfonyl chlorides in the organic solvent produce a polysulfonamide skin. Likewise with diamines or polyamines in the aqueous phase, a polyurea capsule wall is obtainable when the organic phase contains phosgene (chloroformyl chloride), which for convenience of classification herein may be considered to have the properties of a difunctional acid chloride, i.e. in some correspondence with diacid chlorides such as sebacoyl chloride. Also, diamines or polyamines in water and diisocyanates or polyisocyanates in the organic solvents produce a polyurea skin.

With diols or polyols in the aqueous liquid, various other condensate resins are achieved. Thus with diacid or polyacid chlorides in the organic phase, polyesters are produced to constitute the capsule wall. When bischloroformates, polychloroformates or phosgene are used in the organic liquid the capsule skins are polycarbonates. It will further be appreciated that not only are there other complementary intermediates which react to form polycondensates in a direct manner useful in the interfacial condensation process of encapsulation, but various mixtures of intermediates, i.e. reactants, may be employed in either or both of the water and organic phases. For example, mixtures of diols and diamines in the aqueous liquid and also or alternatively, mixtures of acid chlorides and chloroformates in the organic solvent are useful to achieve corresponding condensation copolymers. Also, diols or polyols in the aqueous liquid and diisocyanates or polyisocyanates in the organic liquid produce a polyurethane skin. It will be noted from all of the above and from the examples of the original applications Ser. No. 330,255 and 525,038, both now abandoned, that the described condensation reactions occur between characteristic reactive groups of the intermediates, such groups in acid chlorides and chloroformates being —COCl (chloroformyl), as likewise in phosgene (which can be considered as if it had two such groups), in isocyanates being —NCO, in sulfonyl chlorides being —SO$_2$Cl, in amines being an amine group (i.e. usually primary amines, —NH$_2$), and in diols and polyols being —OH (hydroxy), the effective instances of the latter being primary hydroxy (i.e. attached to primary carbon, as in —CH$_2$OH) or aromatic hydroxy (i.e. attached to a carbon atom of an aromatic ring).

The two liquids should be immiscible, at least one of them being an organic liquid, and the other usually being water. A wide variety of organic solvents may be employed, e.g. as will be recognized to be appropriate for the selected intermediate or intermediates, some examples being mineral oil, xylene, benzene, carbon disulfide, carbon tetrachloride, pentane, and the like, as well as liquids which may not only serve the function of a solvent for the condensate-forming reactant but may also have a reactant function to be availed of after formation of the capsules. Instances of such reactant liquids which in the encapsulation steps of the invention serve simply the function of an organic solvent are styrene and di-t-butyl peroxide.

Examples of difunctional acid-derived compounds are sebacoyl chloride, ethylene bischloroformate, phosgene, terephthaloyl chloride, adipoyl chloride, azelaoyl chloride (azelaic acid chloride), dodecanedioic acid chloride, dimer acid chloride, and 1,3 benzenesulfonyl dichloride. Polyfunctional compounds of this type are exemplified by trimesoyl chloride, 1,2,4,5 benzene tetracid chloride, 1,3,5 benzene trisulfonyl chloride, trimer acid chloride, citric acid chloride, and 1,3,5 benzene trischloroformate. Intermediates similarly useful in the organic phase also include diisocyanates and polyisocyanates, for example toluene diisocyanate, hexamethylene diisocyanate and polymethylene polyphenylisocyanate, e.g. Papi (The Carwin Co.).

As examples of suitable diols for use as intermediates in an aqueous phase, there may be named bisphenol A [2,2 bis (p,p' dihydroxy diphenyl) propane], hydroquinone, resorcinol, catechol, and various glycols such as ethylene glycol, pentanediol, hexanediol, dodecanediol, and the like. Polyfunctional alcohols of this character, e.g. triols, are exemplified by pyrogallol (1,2,3-benzenetriol), phloroglucinol dihydrate, pentaerythritol, trimethylolpropane, 1,4,9,10 tetrahydroxyanthracene, 3,4 dihydroxyanthranol, diresorcinol, tetrahydroxyquinone, anthralin.

Instances of suitable diamines and polyamines, usually selected as water soluble per se or in water soluble salt form, where such reactant is to be included in an aqueous phase, are: substances effective as difunctional reactants (contributing no significant cross-linking effect, of themselves), namely ethylene diamine, phenylene diamine, toluene diamine, hexamethylene diamine, diethylene triamine, piperazine; and susbtances effective as polyfunctional reactants (contributing cross-linking effect, and useful alone or at least in combination with another amine of at least difunctional character), namely 1,3,5-benzene triamine trihydrochloride, 2,4,6-triamino toluene trihydrochloride, tetraethylene pentamine, pentaethylene hexamine, polyethylene imine, 1,3,6 triaminonaphthalene, 3,4,5 triamino-1,2,4 triazole, melamine, 1,4,5,8 tetramino anthraquinone. To the extent that the reactant to be used in the aqueous phase may be insoluble or have limited solubility in water per se, it may be used in a form or with appropriate cooperating substances to render it, in effect, soluble. Thus certain amines may be used in hydrochloride or other salt form, while a compound of little or no water solubility (by itself) such as bisphenol A may be used in a composition appropriately adjusted, as with alkali, to afford such solubility.

In practical operation, normal precautions are taken to avoid unwanted reaction or modification of the substances employed. For example, care should preferably be taken to keep the organic phase, containing the diacid chloride or equivalent intermediate as dry as possible and in isolation from the atmosphere, to avoid hydrolysis. Thus where the organic phase is to be encapsulated and is therefore first dispersed in an aqueous liquid (preferably a dilute water solution of the dispersing agent) prior to being brought together with the diamine, diol or the like, the length of time for effectuating dispersion is made as short as possible, to minimize hydrolysis of the diacid chloride; thus for instance, in adding the organic solvent solution of diacid chloride into the aqueous liquid through a suitable addition funnel, pressure may be applied to the funnel to expedite addition and ultimate dispersion of the organic phase. Where the water phase is to be encapsulated and an aqueous diamine solution, for example, is first dispersed as droplets in a body of organic solvent, the diacid chloride is thereafter brought together therewith in a further quantity of such solvent. This last-mentioned solution of the acid chloride should also, of course, be kept as dry as possible until actual addition and reaction.

In all cases, the agitation employed to establish the dispersion of droplets of one phase in the other, is reduced, usually quite markedly, as and after the second, complementary intermediate is brought together with the continuous phase. Reduced, or indeed conceivably little or no agitation is appropriate at this stage of the process, in order to prevent rupture of the capsules as they form, the chief requirement being simply the attainment of good circulation for effectuation of reaction. While for the most part the condensations occur rapidly at room temperature, indeed essentially instantaneously, appropriate higher or lower temperatures may be employed if desirable for the selected reaction. Likewise, conventional cooperating reagents or additions for adjustment of alkalinity or other pH or like characteristics may be used, as for instance such substances as sodium hydroxide, sodium carbonate and sodium bicarbonate, variously utilized with amines and -ols for the usual reasons known in connection with these condensation reactions.

Tests have indicated that capsules produced in accordance with the present invention can be utilized in the same ways as products of other encapsulation or microencapsulation procedures. Thus for example, encapsulated inks or dyes can be embodied in coatings for transfer purposes, for release by mechanical pressure or like action at desired localities; likewise other materials can be released by mechanical action, or by action of heat or chemicals or prolonged action of moisture, on the capsule wall. Special utility is noted for the encapsulation of organic peroxides, notably liquid peroxides, which have various reagent uses. By encapsulation, premature volatilization or other deterioration of the peroxide is avoided; encapsulation can also serve the purpose, when desired in use of such peroxide, of retarding or delaying its action.

As explained above, cross-linkage is achieved in the polycondensate capsule wall when at least one of the complementary intermediates is a polyfunctional reactant, or preferably when at least one of the intermediates, comprising a difunctional reactant, is accompanied by at least one polyfunctional reactant which is, of course, also complementary in polycondensate-forming reaction to the intermediate (being itself one reactant or a plurality of reactants) with which the above-mentioned difunctional reactant is complementary in polycondensate formation by interfacial reaction. Stated in other words, at least one intermediate should be or include a polyfunctional reactant which is useful for cross-linking and which therefore includes three or more characteristic reactive groups (as identified above), i.e., functional groups, that are effective for linking reaction and that are in general the same as each other. In original as well as further examples of the invention, this has been indicated as requisite for a truly appreciable extent of cross-linkage in the capsule wall, i.e., substantial cross-linkage, of significant effect. It may also be noted that the term intermediate (in one liquid) can be understood herein as referring to either a single reactant or to two or more reactants which are both of complementary reactive effect relative to the other intermediate (likewise being one or more reactants) that is incorporated in the other liquid. In any case, it has been found that the extent of cross-linking will govern the strength, rigidity and porosity of the capsule skin, as will now be understood, and selection of such extent (e.g. as by proportion and nature of the polyfunctional reactant or reactants employed) will be dictated by the requirements of use of the capsule. Thus the range of selection is deemed to include even very rigid and very impermeable capsule wall structure (i.e. as with a very high degree of cross-linking), such capsules being conceived as having utility for special purposes, including some uses where a possibly accompanying brittleness of the wall may be tolerable or even desirable.

As has been previously mentioned, the invention may be practiced in a batch or batch-like form (FIG. 1), or in a continuous or continuous-like form (FIG. 2). When the invention is practiced in a manner resembling a batch process, all the various liquids and the various reactants will be brought together, separated by virtue of time, in a single body of liquid. In general, when dispersion is employed to form the discontinuous phase droplets in the continuous phase liquid, different degrees of agitation will be required in the dispersion-forming stage and in the subsequent second reactant addition stage. As may be seen in FIG. 1, the batch process involves the formation of a body of liquid and as is illustrated in Examples 1–19, in a suitable vessel, with the continuous and discontinuous phase liquids together with the first reactant, after which rapid agitation is practiced to achieve a dispersion of the discontinuous phase liquid in the continuous phase liquid. The liquid which preponderates always becomes the continuous phase liquid. After the dispersion of droplets has been achieved, the second reactant is added to the established body of liquids, and the degree of agitation is sharply reduced while reaction to form capsules about each droplet of continuous phase liquid is underway.

While for many purposes the batch-type form of the inventive process (FIG. 1) is advantageous, in those instances where it is desirable to continuously agitate for dispersion, the continuous-type aspect of the inventive process may be employed. In that aspect of the inventive process, as shown in FIG. 2 and illustrated in Examples 20–21, the dispersion forming stage is separated from the stage wherein the two reactant liquids are brought together, in terms of location in space as well as in terms of time. Thus for example, in a first body of liquid agitation may continuously be practiced at the proper rate to continuously form a dispersion of droplets in a continuous phase liquid, and the continuous spill-over from that first body of liquid may be added to a second body of liquid which is continuously supplied with the second reactant or group of reactants and continuously agitated at the proper rate for reaction. Both the batch and the continuous aspects of the invention are highly desirable, and choice therebetween will rest solely with the desired manufacturing conditions.

The following are a number of examples of the process. Unless otherwise stated, the apparatus employed was a one liter baffled resin reactor, being a vessel or flask of conventional type, equipped with two inlets for addition funnels and with agitating means, i.e. a rotary stirring device. In some of the test operations, to illustrate use of the capsules, a red dye was incorporated in the organic liquid to be encapsulated, e.g. Oil Red Powder (DuPont). It will be appreciated that a large variety of substances or materials can be incorporated in the encapsulated phase, not only pigments and dyes where the capsules are to be employed as releasable inks or transfer coatings, but also other materials for which encapsulation is commonly employed, such as pharmaceuticals, flavoring or perfuming agents, pesticides, herbicides, peroxides, various other reagents, and the like. All percentages herein are expressed by weight, unless otherwise stated.

EXAMPLE 1

In this instance an organic solvent, containing red dye, was encapsulated with a nylon (polyamide) skin, using additionally a trifunctional amine and a trifunctional acid chloride as cross-linking agents for improvement of the skin of the capsule. Here and in succeeding examples 2 to 4, encapsulation was thus of the nature of an oil-in-water suspension. Charges were established in the flask and funnels as follows, the suspending or dispersing agent (Elvanol) having been first dissolved (to make the 0.5% solution of it) in the water by use of a Waring Blendor:

In flask:
　　300 ml. aqueous 0.5% Elvanol 50–42 solution
In 1st funnel:
　　75 ml. xylene
　　0.2 g. Oil Red Powder (DuPont)
　　12 g. sebacoyl chloride (0.05 mole)
　　3 ml. trimesoyl trichloride
In 2nd funnel:
　　50 ml. distilled water
　　12 g. ethylene diamine (0.2 mole)
　　4.65 g. 1,3,5-benzenetriamine trihydrochloride (0.02 mole)
　　2.4 g. sodium hydroxide (to neutralize hydrochloride acid in trifunctional amine)
　　10 g. sodium carbonate, monohydrate During the addition from the first funnel, which was rapidly effected, the mixture was strongly agitated to form visible droplets and thus to provide a dispersion of such droplets of the organic phase (xylene), the agitation being slowed down following completion of this first addition. Slow agitation was continued during the second, similarly rapid addition, which effectuated the encapsulation of the droplets by polycondensation, and thereafter the contents of the flask were allowed to stand for two hours to strengthen the polyamide skin of the capsules. The mixture was then filtered and the resulting capsules were washed with acetone and dried. The product consisted of firm-walled capsules of about 1 mm. in diameter.

EXAMPLE 2

In this instance the organic phase consisted of styrene monomer, encapsulated in nylon. The operation was followed by treatment which polymerized the styrene, yielding solid particles of polystyrene enclosed in nylon. The following charges were employed, the mixture of styrene with acid chloride and other ingredients including benzoyl peroxide, all to constitute the organic phase, being first purged with nitrogen to avoid any premature reactions:

In the flask:
    100 ml. styrene
    8 ml. divinyl benzene
    1 g. benzoyl peroxide
    4.8 g. sebacoyl chloride (0.02 mole)
    100 ml. 0.5% aqueous Elvanol 50–42 solution
In addition funnel:
    6.7 g. 70% hexamethylene diamine solution (0.04 mole)
    8 g. sodium carbonate
    50 ml. distilled water The styrene-diacid chloride solution was dispersed in the aqueous Elvanol solution by rapid agitation. The aqueous diamine solution was then added to the flask and stirred slowly for 10 minutes. The contents of the flask were diluted with distilled water and filtered on a Buchner funnel. The capsules were then added, with 500 ml. distilled water, to a one liter baffled resin reaction flask equipped with a stirrer, condenser and a thermometer and maintained at 80° C. for 5 hours. The product was then filtered and washed on a Buchner funnel and dried at 60° C. The particles were spheres from 250 microns to less than 75 microns in diameter. Thus following the encapsulation, the styrene was appropriately polymerized, with the aid of the benzoyl peroxide content, while maintaining the capsule walls intact, thus illustrating the encapsulation, in effect, of solid materials. Although no cross-linking was employed, this example shows, as stated, encapsulation of a solid, it being now obvious that these operations could be used with specific features of improvement elsewhere herein described, such as continuous operation and cross-linking.

EXAMPLE 3

In this instance the following solutions were charged in the flask and funnels:

In flask:
    300 ml. 0.33% aqueous Elvanol 50–42 solution
In 1st funnel:
    100 ml. carbon disulfide
    12 g. sebacoyl chloride (0.05)
    4 ml. trimesoyl trichloride (for cross-linking)
In 2nd funnel:
    50 ml. distilled water
    12 g. ethylene diamine (0.5 mole)
    2.3 g. 1,3,5-benzene triamine trihydrochloride (0.01 mole) (for cross-linking)
    1.2 g. sodium hydroxide
    10 g. sodium carbonate monohydrate The additions were consecutive and rapid. The agitation was adjusted to form visible droplets and slowed down after the first addition. The final contents were stirred for one-half hour and allowed to stand for an additional one and one-half hours, then filtered, water washed, acetone washed and air dried. The size of the nylon-walled, carbon disulfide-filled capsules was 1 to 2 mm. in diameter.

EXAMPLE 4

This example involved encapsulation of ditertiary-butyl peroxide as the organic liquid, a 500 ml. baffled resin reactor or reaction flask being used. The following charges were made up:

In flask:
    100 ml. 0.5% aqueous Elvanol 50–42 solution
In 1st funnel:
    6 g. di-t-butyl peroxide
    4 g. sebacoyl chloride
    1 ml. trimesoyl trichloride
In 2nd funnel:
    6 g. ethylene diamine
    2.3 g. 1,3,5-benzene triamine·3HCl
    1.2 g. sodium hydroxide
    5 g. sodium carbonate monohydrate
    75 ml. distilled water An ice bath was used. The additions were consecutive and rapid. The agitation was adjusted to form visible droplets and was slowed down after the first addition. The contents were stirred for ¾ hour. The product was then acetone washed by decantation, filtered and air dried. The resulting small capsules consisted of the stated liquid peroxide encased in a nylon skin, i.e. polyamide cross-linked by the effects of the trifunctional acid chloride and the triamine containing three primary amino groups. Such product has utility in storage and handling of this highly reactive chemical as a commercial reagent.

EXAMPLE 5

This example illustrates encapsulation of an aqueous liquid, i.e. the water phase, with an appropriate polycondensate skin, e.g. nylon. The following charges were made up:

In flask:
    200 ml. carbon tetrachloride
    100 ml. pentane
In 1st funnel:
    10 ml. distilled water
    5 g. ethylene diamine
    2.0 g. 1,3,5-benzenetriamine hydrochloride
    0.7 g. sodium hydroxide
In 2nd funnel:
    50 ml. carbon tetrachloride
    12 g. sebacoyl chloride
    3 ml. trimesoyl trichloride It will be noted that here the organic liquid was in relatively very large amount and the amine-containing aqueous phase was added and dispersed before addition of the acid chlorides to the continuous, organic phase. Agitation was performed during and immediately after addition of the aqueous phase from the first funnel, i.e. to produce visible droplets. It was then slowed down and the solution from the second funnel was incorporated, and the reaction effected to produce the desired capsules. They were filtered from the contents of the flask and constituted discrete, satisfactory, cross-linked polyamide capsules, about 1 millimeter in diameter, containing an aqueous liquid.

EXAMPLE 6

In this example the organic phase, i.e. as an oil-in-water suspension, was encapsulated with a cross-linked polyester skin, prepared by reaction of di- and trifunctional acid chlorides with a trihydroxy compound. The following solutions were prepared:

In flask:
    300 ml. 0.5% aqueous Elvanol 50–42 solution
In 1st funnel:
    12 g. sebacoyl chloride (0.05 mole)
    4 ml. trimesoyl trichloride
    50 ml. xylene
    0.2 g. Oil Red Powder (Du Pont)
In 2nd funnel:
    12.6 g. pyrogallol (1,2,3-benzenetriol) (0.1 mole)
    2 g. sodium hydroxide
    50 ml. distilled water The additions were rapid and consecutive. As before, agitation was initiated at the time the first addition was commenced, being adjusted to form visible droplets, and being slowed down after the first addition. The produced mass of polyester capsules was filtered on a Buchner funnel, the capsules remaining on the funnel and being found to have a diameter of about 0.5 to 1 mm.

EXAMPLE 7

In this instance the organic liquid was encapsulated with a polyurea skin, i.e. by reaction of phosgene and a diamine to yield

with effective cross-linking. The following charges were prepared:

In flask:
  300 ml. 0.5% aqueous Elvanol 50–42 solution
In 1st funnel:
  50 ml. 12.5% phosgene in benzene
In 2nd funnel:
  18 g. ethylene diamine
  4.6 g. 1,3,5-benzenetriamine·3HCl
  2.4 g. sodium hydroxide
  10 g. sodium carbonate monohydrate
  100 ml. distilled water The additions were made and agitation was initiated and reduced as in previous examples. The visible droplets formed were encapsulated with the polyurea skin, the contents of the flask being stirred moderately (after addition of the diamine solution) for one and one-half hours. Small capsules were formed.

EXAMPLE 8

In this operation, by oil-in-water suspension, the organic liquid was encapsulated with a polycarbonate skin, here being the reaction of phosgene and a diol to yield

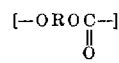

with effective cross-linking by the inclusion of a triol having three aromatic hydroxy groups, pyrogallol. The prepared solutions were:

In flask:
  300 ml. 0.5% aqueous Elvanol 50–42 solution
In 1st funnel:
  50 ml. 12.5% phosgene in benzene solution
In 2nd funnel:
  12.1 g. bisphenol A (0.075 mole)
  6.3 g. pyrogallol (0.05 mole)
  10 g. NaOH
  200 ml. distilled water Again, the additions were consecutive and rapid, the agitation being adjusted to form visible droplets and being slowed down after the first addition. The contents of the flask were stirred moderately for one hour. Small polycarbonate capsules, containing benzene, were formed.

EXAMPLE 9

This is a further instance of encapsulation of the oil, i.e. organic phase, with a polycarbonate skin. Here the reaction occurred between the bischloroformate and a diol to yield

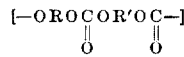

cross-linked by use of a trifunctional alcohol. The following charges were employed:

In flask:
  300 ml. aqueous Elvanol 50–42 solution
In 1st funnel:
  11 ml. ethylene bischloroformate
  100 ml. xylene In 2nd funnel:
  11.4 g. bisphenol A
  2 g. phloroglucinol dihydrate (trifunctional alcohol)
  10 g. sodium hydroxide. (All dissolved in Waring Blendor at slow speed.)

The procedure was as stated in the preceding example, and was found to yield small capsules having a polycarbonate wall.

EXAMPLE 10

In this example, a liquid organic pesticide, Diazinon (Geigy), was encapsulated in a polyurethane wall. The wall or skin was formed using a polyfunctional isocyanate and a difunctional alcohol, and was effectively cross-linked.

In flask:
  600 ml. 0.5% Elvanol 50–42 (DuPont)
First addition:
  60 g. Diazinon
  15 g. polymethylene polyphenylisocyanate (PAPI, Upjohn)
Second addition:
  15 g. 1.5 pentanediol
  50 g. distilled water The above encapsulation was performed in a 1 liter baffled resin flask with a Teflon blade stirrer operating at 20 r.p.m. The additions were rapid and consecutive. The capsules were allowed to stir for five hours and then were filtered on a Buchner funnel, washed and filtered again. They were then placed in a hood to be air-dried. The cross-linked polyurethane capsules which resulted were free-flowing and spherical.

Another specific instance of reactants to produce capsules with a cross-linked polyurethane skin is represented in an operation for encapsulating an aqueous liquid using diethyleneglycol bischloroformate in the continuous phase (e.g. mineral oil), reacting with hexamethylene diamine and 2,4,6 triamino toluene trihydrochloride (for cross-linking) in the aqueous liquid, to yield

plus the stated cross-linkage.

EXAMPLE 11

This is an instance of an oil-in-water encapsulation with a polyurea-polyamide skin, thus illustrating production of a copolymer (also strengthened by cross-linking) by interfacial polycondensation. Charges were prepared as follows:

In flask:
  300 ml. 0.5% aqueous Elvanol 50–42 solution
In 1st funnel:
  100 ml. xylene
  15 ml. toluene 2,4-diisocyanate
  2 ml. trimesoyl trichloride (for cross-linking)
In 2nd funnel:
  18 g. ethylenediamine
  5 g. diethylenetriamine
  10 g. sodium carbonate, monohydrate
  100 ml. distilled water The additions were rapid and consecutive. The agitation was adjusted to form visible droplets and was slowed down after the first addition. Contents were stirred for one hour an then filtered. Capsules of xylene were obtained.

EXAMPLE 12

In this example, oil-in-water encapsulation was effected to produce a copolymer skin (polyamide-polyurea), cross-linking being achieved with polymethylene polyphenylisocyanate. The organic liquid encapsulated was a pesticide, Malathion (American Cyanamid). Reaction was carried out in a 500 ml. resin flask, having a high speed stirrer (20,000 r.p.m.); charges as follows:

In flask:
    300 ml. 0.5% Elvanol 50–42 solution with 6 drops antifoam B (Dow, Corning)
In 1st funnel:
    29.8 g. Malathion
    13 g. azelaoyl chloride
    2 g. polymethylene polyphenylisocyanate (Papi, from Carwin Co.)
In 2nd funnel:
    20 g. diethylenetriamine
    10 g. sodium carbonate monohydrate
    100 ml. distilled water The contents of the 1st and 2nd funnels were added consecutively with agitation at high speed. The speed was then reduced and agitation was continued for one hour. After allowing the contents to stand for one additional hour, they were filtered on a Buchner funnel and dried in a vacuum oven at room temperature. Small (less than 1 mm.) capsules were obtained. In use in pesticide preparations, these pesticide-containing capsules can release their contents by grandual diffusion, or by leaching action, as over a prolonged time, in the presence of moisture.

EXAMPLE 13

In this example, an organic liquid pesticide, Diazinon (see Example 10) was encapsulated in a polyamide-polyurea skin cross-linked by employing a polyfunctional isocyanate for the polyurea reaction. This encapsulation was carried out in a 1000 ml. baffled resin flask. Agitation was by means of a Servodyne stirrer with a 2" Teflon blade at a speed of 150 r.p.m. Encapsulation proceeded:

In the flask:
    600 ml. 0.5% Elvanol 50–42 water solution
In 1st addition:
    60 g. Diazinon
    5 g. sebacoyl chloride
    7 g. polymethylene polyphenylisocyanate (Papi)
In 2nd addition:
    15 g. piperazine
    100 ml. water
    4 g. NaOH The additions were rapid and consecutive. The second addition was added about 15 seconds after the first addition. Large spherical capsules formed. The capsules ranged in size from 70 to 100 microns. The capsules were allowed to stir for three hours and remained in slurry form overnight. The capsules were then filtered, washed, and placed in a circulating oven to dry at 35° C. Free flowing capsules result.

EXAMPLE 14

For producing a cross-linked polyamide skin, this encapsulation was carried out in a 1000 ml. baffled resin flask. Agitation was by means of a Servodyne stirred with a 2" Teflon blade at a speed of 250 r.p.m. The encapsulation proceeded as follows:

In the flask:
    600 ml. 0.5% Elvanol 50–42 water solution
In 1st addition:
    100 ml. Diazinon
    10 g. sebacoyl chloride
In 2nd addition:
    8 g. 70% 1,6 hexamethylendiamine
    4 g. 1,3,5 triaminobenzene
    25 g. $Na_2CO_3$ anhydrous
    150 ml. distilled water The additions were rapid and consecutive. The second addition was added about 15 seconds after the first addition. Capsules formed and were observed in the slurry. After washing and filtration the capsules were fully discrete and fully retained their individuality.

EXAMPLE 15

In this instance an aqueous phase was encapsulated in polyamide by reaction of dimer acid chloride with tetraethylene pentamine. The encapsulation was carried out in a 1000 ml. baffled resin flask, with stirring by a Teflon blade. The encapsulation proceeded as follows:

In the flask:
    130 ml. petroleum ether (boiling range 30–60° C.)
    230 ml. carbon tetrachloride
    5 g. talc, U.S.P.
In 1st addition:
    3.8 g. tetraethylene pentamine
    3.7 g. calcium hydroxide
    20 ml. distilled water
In 2nd addition:
    241 ml. dimer acid chloride solution
    5 g. talc, U.S.P.

Each suspension was stirred just sufficiently to keep the insoluble materials apparently well suspended. After a four-hour reaction at room temperature, the large, rubbery, lenticular, millimeter-size capsules were washed with petroleum ether and dried in the atmosphere overnight. Water could be pressed from these dried capsules. A similar preparation in the absence of calcium hydroxide yielded minute capsules only.

The dimer acid chloride solution was prepared as follows, and contained 12.5% (weight/volume) of nonvolatiles: A solution of 169.8 g. of Empol 1024, an Emery Industries product, containing about 79% dimer acid and 21% trimer acid, and 36.6 g. of phosphorous trichloride was heated under reflux for 3 hours. When cooled, the product was extracted from a residue to 625 ml. of petroleum ether and the carbon tetrachloride, to a combined extract volume of 1000 ml.

EXAMPLE 16

In this example, the organic liquid pesticide Diazinon was encapsulated in cross-linked polyamide using piperazine (as amine reactant) and a mixture of di- and tri-acid chlorides, specifically sebacoyl chloride and trimer acid chloride. Using apparatus as in the preceding example, the process involved:

In the flask:
    600 ml. 0.5% Elvanol 50–42
In 1st addition:
    60 g. Diazinon
    12 g. sebacoyl chloride and trimer acid chloride
In 2nd addition:
    15 g. piperazine
    100 g. water
    10 g. NaOH The first addition was dispersed with rapid stirring and the second addition was made fifteen seconds after the first addition. The dispersion semi-emulsified itself as the initial portion of the second addition was added, with reduced stirring. Satisfactory, discrete, full-shaped capsules were formed along with some pieces of polymer and fragments.

The mixture of sebacoyl chloride and trimer acid chloride was prepared as follows: $PCl_3$ (600 g.) was added to a 5 l. flask and heated to 45° C. Sebacic acid (500 g.) was added to the $PCl_3$, followed by the addition of trimer acid (160 g.; Empol 1043). Temperature dropped to 35° C. 400 g. more sebacic acid was added and the temperature was raised to 50° C. After 20 minutes reaction time, the batch allowed to cool to room temperature and the phases were separated. Clear separation of phases occurred at room temperature. The product was recovered, being the desired mixture of acid chlorides.

EXAMPLE 17

This is another example wherein a polyfunctional isocyanate material (understood to comprise chiefly a compound containing three isocyanate groups) alone constituted one of the complementary intermediates and also provided the sole, significant cross-linking function, here to produce a cross-linked polyurea capsule wall. This encapsulation was carried out in a 2000 ml. indented 3 neck flask. Agitation was by means of a Premier Dispersator, for agitation to disperse the organic-liquid addition and to promote the subsequent reaction. The encapsulation proceeded as follows:

In the flask:
    600 ml. 0.5% Elvanol 50–42 water solution
In 1st addition:
    240 g. Diazinon
    50 g. polymethylene polyphenylisocyanate (Papi)
In 2nd addition:
    19.5 g. $Na_2CO_3$ Anhydrous
    22.5 g. ethylenediamine
    22.5 diethylenetriamine
    200.0 g. distilled water The additions were rapid and consecutive. The second addition was added approximately 15 seconds after the first addition. Capsules formed and could be observed in the slurry. The capsules were allowed to stir for three hours after which they were washed, filtered, and placed in a circulating oven at 30° C. overnight. Free flowing capsules resulted.

EXAMPLE 18

In this example cross-linked polyester capsules were obtained using a diacid chloride and an aromatic triol. All systems were purged with nitrogen for at least five minutes before the start of the reaction. The reaction in the flask was covered with a blanket of nitrogen during the encapsulation. The encapsulation was carried out in a 2-liter, 3-hole, baffled flask. Agitation was by means of a Servodyne stirrer with a 2 inch Teflon blade at a speed of 200 r.p.m. The encapsulation proceeded as follows:

In the flask:
    600 ml. 0.5% Elvanol 50–42 water solution
In 1st addition:
    30 g. Diazinon
    7 g. sebacoyl chloride
In 2nd addition:
    6.2 g. $Na_2CO_3$
    9.5 g. Phloroglucinol
    200 ml. water The additions were rapid and consecutive. The second addition was added about 15 seconds after the first addition. The pH of the slurry was neutral after 20 minutes of reaction. Capsules of 30–300 microns diameter were formed. The capsules were left stirring for three hours. Microscopic examination showed individual, spherical well-formed capsules.

EXAMPLE 19

In this example Aroclor 1221, a chlorinated diphenyl, was encapsulated in a cross-linked polysulfonamide wall using benzenetrisulfonyl chloride and hexanediamine.

In the flask:
    600 ml. 0.5% Elvanol 50–42
In 1st addition:
    9.3 g. 1,3,5-benzenetrisulfonyl chloride
    175 ml. Aroclor 1221
In 2nd addition:
    4 g. 1,6-hexanediamine (80–85%)
    9 g. sodium carbonate
    100 ml. water The encapsulation was performed in a 1 liter baffled resin flask with a Teflon blade stirrer rotating at 300 r.p.m. The additions were rapid and consecutive. The final mixture was stirred for one hour. The capsules in slurry form were examined by microscope. They were well-rounded spherical capsules. The capsules were then washed and placed in a hood to be dried by the constant flow of air. The next morning the capsules were examined. This revealed that even though the capsules had not completely dried, they had begun to become free-flowing and were not wet with solvent.

EXAMPLE 20

This example and the succeeding Example 21 illustrate the continuous aspect of the process according to the invention. In this example two streams of liquid, one of which contains the first reactant in solution therein, are continuously supplied to a first body of liquid, wherein there is established appreciable agitation appropriate to dispersion. The overflow from this first body of liquid is continuously supplied to a second body of liquid containing the second reactant, the second body being subjected to a much lower degree of agitation appropriate to reaction. In the present example, the two streams supplied to the first body of liquid are regulated so that the aqueous stream preponderates, thereby determining that the encapsulation shall be of the nature of an oil-in-water suspension, i.e., encapsulating the organic phase. It will be understood that in order to encapsulate the aqueous phase, it is necessary to adjust the rate of the two streams so that the organic stream preponderates. The two streams supplying the first body of liquid contained the following proportions by weight:

In 1st stream:
    544,540 parts distilled water
    260 parts 0.5% aqueous Elvanol 50–42 solution
    20 parts antifoam agent In 2nd stream:
    20,000 parts Diazinon 83.3% assay
    1,500 parts sebacoyl chloride
    2,036 parts polymethylene polyphenylisocyanate (Papi, from Carwin Co.) (having the cross-linking action)

A third stream was established supplying the second body of liquid, and contained the following proportions by weight:

In 3rd stream:
    1,867 parts diethylenetriamine
    1,905 parts sodium carbonate monohydrate
    117,000 parts distilled water The first body of liquid was continuously supplied by the first and second streams at the following flow rates:

1st stream: 2.0 gal./min.
2nd stream: 0.9 gal./min.

The first body of liquid was subjected to a high rate of agitation resulting in a continuous creation of a dispersion of the organic liquid in the aqueous liquid. The overflow from the first body of liquid, including the discontinuous droplets, was continuously supplied to the second body of liquid. The second body of liquid was continuously supplied by the third stream at the following flow rate:

3rd stream: 1.0 gal./min.

The second body of liquid was continuously agitated at a speed considerably lower than the agitation established in the first body of liquid. The second body of liquid was subjected to this slow agitation for approximately three hours, after which it was filtered on a Knutch filter and dried on a Glatt fluidized bed drier, Model TR–5, using an inlet temperature of 35–40 degrees C. with a drying exposure of 30–40 minutes. The recovered product comprised discrete cross-linked polyamide-polyurea capsules containing the organic phase, i.e. the oil. The capsules were small, being predominantly in the 30–80 micron range, and were of desirable quality.

EXAMPLE 21

The procedure of Example 20 was repeated, using streams having the same quantitative and qualitative composition, but the flow rates of the second and third streams were changed as follows:

1st stream: 2.0 gal./min.
2nd stream: 0.8 gal./min.
3rd stream: 1.0 gal./min.

The rate of agitation in the first body of liquid was lowered to accommodate the intended larger capsule formation. The recovered product was of equal quality to that described in Example 14, and was predominantly in the 200–500 micron range in size.

What is claimed is:

1. A process of encapsulation by interfacial condensation of complementary, organic, polycondensate-forming intermediates reacting to form polycondensate selected from the group consisting of polyamide, polysulfonamide, polyester, polycarbonate, polyurethane and polyurea, comprising (1) establishing, by agitation, a dispersion of to-be-enacapsulated droplets containing a first of said intermediates, in a body of liquid which is in continuous phase and is immiscible with the droplets and is essentially free of any reactant complementary to said first intermediate, and (2) thereafter bringing a second of said intermediates, that is complementary to the first intermediate, into the continuous liquid phase so that the first and second inermediates react at the interfaces between the droplets and the continuous phase to encapsulate the droplets within a skin of said selected polycondensate, at least one of said first and second intermediates comprising at least in part a polyfunctional reactant which (a) is complementary to and effective for cross-linking reaction with the other of said first and second intermediates and (b) has at least three reactive groups that are the same as each other and are effectively functional in said selected polycondensate-forming reaction and that are selected from the class consisting of amine, hydroxy, isocyanate, —COCl, and —SO₂Cl groups, said first and second intermediates thereby reacting to encapsulate the droplets within the aforesaid polycondensate skin having cross-linkage therein.

2. A process as defined in claim 1, in which the polycondensate, which the intermediates react to form, comprises polycondensate selected from the group consisting of polyurea and polyurethane, and in which the aforesaid polyfunctional reactant is a polyisocyanate having at least three isocyanate groups.

3. A process as defined in claim 1, in which the polycondensate, which the intermediates react to form, comprises polycondensate selected from the group consisting of polyamide, polyurethane, polyester and polycarbonate, and in which the aforesaid polyfunctional reactant is a substance having at least three —COCl groups.

4. A process as defined in claim 3, in which the polycondensate, which the intermediates react to form, comprises polycondensate selected from the group consisting of polyamide and polyester, and polycarbonate, and in which the aforesaid polyfunctional reactant is a trifunctional acid chloride.

5. A process as defined in claim 1, in which the first and second intermediates respectively comprise difunctional reactants complementary to each other in polycondensate-forming reaction, the aforesaid polyfunctional reactant also present in one of the intermediates being complementary to the difunctional reactant in the other intermediate in polycondensate-forming reaction.

6. A process as defined in claim 1, in which the droplets established as a dispersion are droplets of organic liquid and the continuous phase liquid is aqueous liquid, said intermediates being thereby effective to encapsulate said organic liquid droplets in the selected polycondensate skin.

7. A process as defined in claim 6, wherein said intermediates comprise polyamide-forming intermediates, for encapsulating the droplets in a skin comprising polyamide.

8. A process as defined in claim 6, wherein said intermediates comprise polyester-forming intermediates, for encapsulating the droplets in a skin comprising polyester.

9. A process as defined in claim 6, wherein said intermediate comprise polyurea-forming intermediates, for encapsulating the droplets in a skin comprising polyurea.

10. A process as defined in claim 6, wherein said intermediates comprise polycarbonate-forming intermediates, for encapsulating the droplets in a skin comprising polycarbonate.

11. A process as defined in claim 6, wherein said intermediates comprise polyurethane-forming intermediates, for encapsulating the droplets in a skin comprising polyurethane.

12. A process as defined in claim 1, wherein said selected polycondensate is a condensation copolymer, at least one of said first and second intermediates comprising at least two reactants respectively constituted to form, with the other of said first and second intermediates, different polymeric structures of the aforesaid group of polyamide, polysulfonamide, polyester, polycarbonate, polyurethane and polyurea.

13. A process as defined in claim 1, in which the droplets comprise material selected from the class consisting of pesticides, said encapsulation of said droplets producing capsules containing said material.

14. A process of encapsulation by interfacial condensation of complementary, organic, polycondensate-forming intermediates reacting to form polycondensate selected from the group consisting of polyamide, polysulfonamide, polyester, polycarbonate, polyurethane and polyurea, comprising (1) establishing, by agitation, a dispersion of to-be-encapsulated droplets of organic liquid containing a first of said intermediates, in a body of aqueous liquid which is in continuous phase and is immiscible with the droplets and is essentially free of any reactant complementary to said first intermediate, and (2) thereafter bringing a second of said intermediates, that is complementary to the first intermediate, into the continuous liquid phase so that the first and second intermediates react at the interfaces between the droplets and the continuous phase to encapsulate the droplets within a skin of said selected polycondensate, said first and second intermediates respectively comprising first and second difunctional reactants complementary to each other in polycondensate-forming reaction, at least one of said first and second intermediates also comprising a polyfunctional reactant which (a) is complementary to and effective for cross-linking reaction with the other of said first and second intermediates and (b) has at least three reactive groups that are the same as each other and are effectively functional in said selected polycondensate-forming reaction and that are selected from the class consisting of amine, hydroxy, isocyanate, —COCl, and —SO₂Cl groups, said first and second intermediates thereby reacting to encapsulate the organic liquid droplets within the aforesaid polycondensate skin having cross-linkage therein.

15. A process as defined in claim 14, in which said selected polycondensate is a condensation copolymer consisting of polyamide-polyurea, and in which: said first intermediate, contained in the droplets, comprises a difunctional, polycondensate-forming acid chloride and the aforesaid polyfunctional reactant; said polyfunctional reactant is a polyisocyanate which has at least three isocyanate groups effective for linking in reaction with amine groups; and said second intermediate, which is brought into the continuous aqueous liquid phase, comprises an amine complementary to said acid chloride and said polyisocyanate; said intermediates thereby reacting for encapsulating said droplets within a cross-linked skin comprising said copolymer.

16. A process as defined in claim 14, in which the droplets comprise material selected from the class consisting of pesticides, said encapsulation of said droplets producing capsules containing said material.

17. A process of encapsulation by interfacial condensation of complementary, organic, polycondensate-forming intermediates reacting to form polycondensate selected from the group consisting of polyamide, polysulfonamide, polyester, polycarbonate, polyurethane and polyurea, comprising (1) establishing, by agitation, a dispersion of to-be-encapsulated droplets of a first liquid containing a first of said intermediates, in a body of a second liquid which is in continuous phase and is immiscible with the droplets and is essentially free of any reactant complementary to said first intermediate, one of said first and second liquids being an aqueous liquid and the other being an organic liquid, and (2) thereafter bringing a second of said intermediates, that is complementary to the first intermediate, into the continuous liquid phase so that the first and second intermediates react at the interfaces between the droplets and the continuous phase to encapsulate the droplets within a skin of said selected polycondensate, at least one of said first and second intermediates comprising at least in part a polyfunctional reactant which (a) is complementary to and effective for cross-linking reaction with the other of said first and second intermediates and (b) has at least three reactive groups that are effectively functional in said selected polycondensate-forming reaction, the intermediate which comprises said polyfunctional reactant being employed in said aqueous liquid and said polyfunctional reactant being a substance having at least three groups which are the same as each other and which are selected from the class consisting of amine and hydroxy groups, said first and second intermediates thereby reacting to encapsulate the droplets within the aforesaid polycondensate skin having cross-linkage therein.

18. A process of encapsulation by interfacial condensation of complementary, organic, polycondensate-forming intermediates reacting to form polycondensate selected from the group consisting of polyamide, polysulfonamide, polyester, polycarbonate, polyurethane and polyurea, comprising: (1) continuously supplying, at a first locality, first and second liquids which are substantially immiscible and of which the first contains a first of said intermediates and the second is essentially free of any reactant complementary to said first intermediate, and continuously establishing, by agitation, a dispersion of to-be-encapsulated droplets containing the first liquid, in a body of the second liquid which is in continuous phase, at said locality; (2) thereafter continuously advancing said continuous-phase liquid containing said dispersion of droplets from said first locality to a second locality and at said second locality continuously bringing a second of said intermediates, that is complementary to the first intermediate, into the continuous liquid phase so that the first and second intermediates react at the interfaces between the droplets and the continuous phase to encapsulate the droplets within a skin of said selected polycondensate; and (3) continuously delivering a product comprising the encapsulated droplets.

19. A process as defined in claim 18, in which at least one of said first and second intermediates comprises at least in part a polyfunctional reactant which (a) is complementary to and effective for cross-linking reaction with the other of said first and second intermediates and (b) has at least three reactive groups that are the same as each other and are effectively functional in said selected polycondensate-forming reaction and that are selected from the class consisting of amine, hydroxy, isocyanate, —COCl, and —SO$_2$Cl groups, said first and second intermediates thereby reacting to encapsulate the droplets within the aforesaid polycondensate skin having cross-linkage therein.

References Cited

UNITED STATES PATENTS

| | | | |
|---|---|---|---|
| 3,069,370 | 12/1962 | Jensen et al. | 252—316X |
| 3,078,242 | 2/1963 | Morgan | 264—171X |
| 3,079,217 | 2/1963 | Whitfield et al. | 117—161X |
| 3,208,951 | 9/1965 | Berger et al. | 252—316 |
| 3,270,100 | 8/1966 | Jolkovski et al. | 252—316X |

RICHARD D. LOVERING, Primary Examiner

U.S. Cl. X.R.

99—140, 166; 106—20, 22, 308; 117—36.2, 100; 252—182, 186, 316, 522; 264—4; 424—200, 213

UNITED STATES PATENT OFFICE
CERTIFICATE OF CORRECTION

Patent No. 3,577,515            Dated May 4, 1971

Inventor(s) JAN E. VANDEGAER

It is certified that error appears in the above-identified patent and that said Letters Patent are hereby corrected as shown below:

Col. 1, line 45, "wtih" should read --with--

Col. 8, line 12, "susbtances" should read --substances--

Col. 15, line 49, "100" should read --1000--; line 59, "stirred" should read --stirrer--; line 60, "follews" should read --follows--

Col. 16, line 36, "to" should read --by--; line 37, "the" should read --then--; line 72, after "batch" insert --was--

Col. 19, after line 15, insert the following paragraph:

--It is to be understood that the invention is not limited to the specific compounds and operations herein described but may be carried out in other ways without departure from its spirit.--

Col. 20, lines 8 and 9, "intermediate" should read --intermediates--

Signed and sealed this 28th day of December 1971.

(SEAL)
Attest:

EDWARD M. FLETCHER, JR.
Attesting Officer

ROBERT GOTTSCHALK
Acting Commissioner of Patents